United States Patent Office 2,745,629
Patented May 15, 1956

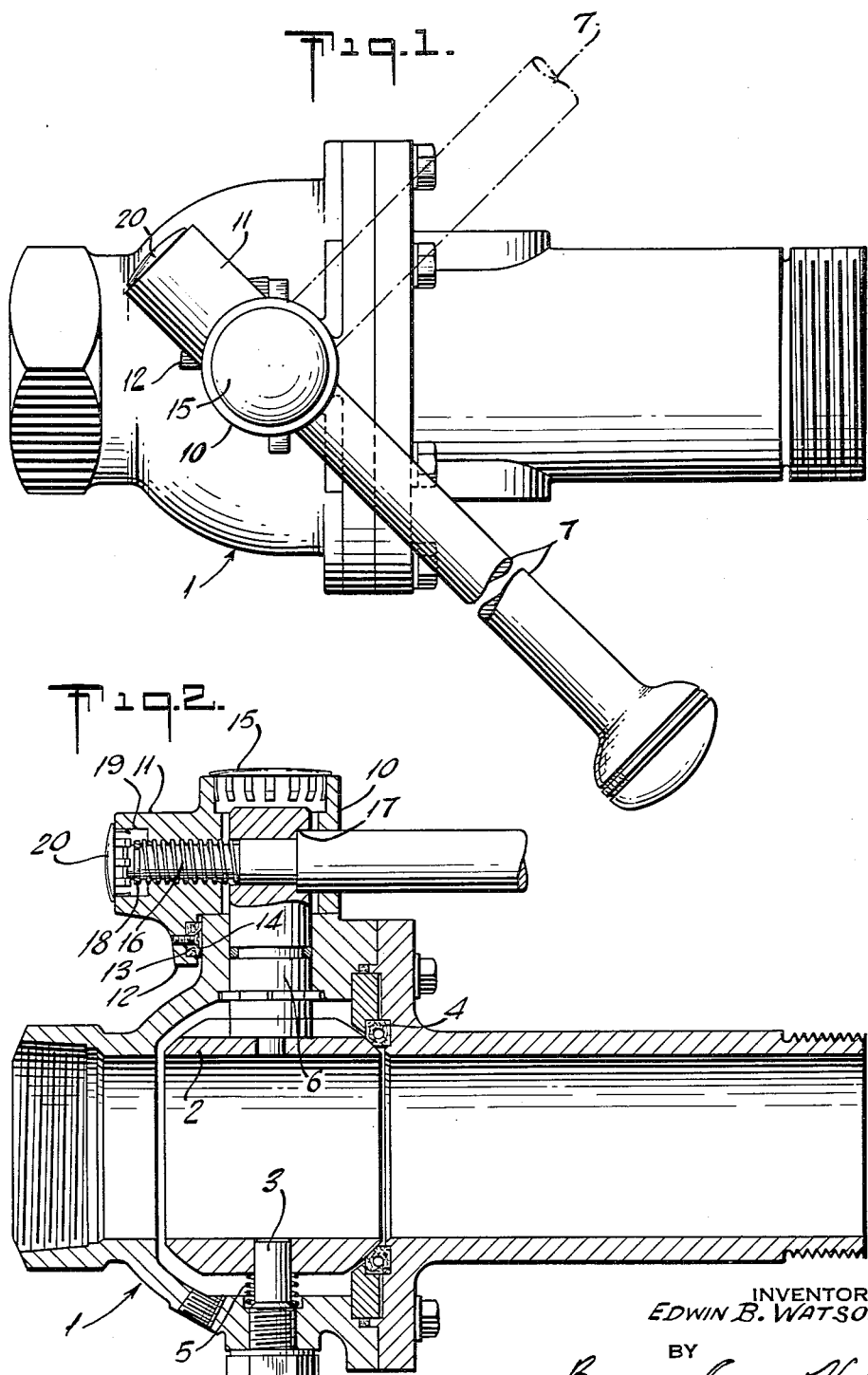

2,745,629

VALVE LOCKING MECHANISM

Edwin B. Watson, Ithaca, N. Y., assignor, by mesne assignments, to American La France Corporation, Elmira, N. Y., a corporation of Delaware Application December 3, 1954, Serial No. 472,903

3 Claims. (Cl. 251—96)

Rotary water valves as used in connection with various types of fire apparatus, and especially so-called ball valves, which are designed to be opened and closed by a relatively short swing of an actuating handle, tend to creep toward the closed position as the result of the hydraulic forces acting on the valve or ball in its various settings.

The object of this invention is to provide a simple and inexpensive but effective mechanism by which the valve can readily be locked in full open or any intermediate position, and as readily unlocked when the valve setting is to be changed.

In general, the invention contemplates the use of a locking member associated with the valve actuating handle and operated by a partial turn or twist of the handle about its own axis, the handle being swung bodily about the axis of the valve, in the usual manner, to open and close the valve.

The invention will be readily understood from the following description of the accompanying drawings which illustrate a valve incorporating a preferred embodiment of the invention, in Fig. 1 in plan and Fig. 2 in vertical action.

The illustrated valve includes a housing, generally designated 1, in which is mounted the valve element or ball 2 which is rotatable about the axis of pin 3 in contact with a sealing ring 4. A spring 5 sustains the ball. Projecting from the top of the ball is a stem 6 journalled in the upper part of the valve housing and protruding above it. As usual, the valve is opened and closed by means of a handle 7 operatively connected to and extending transversely of the valve system.

According to the invention, a locking element or shoe is provided having threaded engagement with the handle adjacent the valve stem, the arrangement being such that by a twist of the handle about its own axis the shoe is caused to move into or out of engagement with a surface of the housing so as to lock the valve or free it, as the case may be.

In this preferred form, the locking element or shoe is in the form of a sleeve 10 surrounding the protruding valve stem with some clearance so as to be movable laterally of the stem. The sleeve has a boss 11 and, overlying the housing, a depending portion 12 which may have an insert 13 of friction material, such as brake lining. The opposing surface 14 of the housing is of arcuate shape and concentric with the valve stem. The upper end of the sleeve may be closed by a snap-in plug 15.

At its inner end the handle 7 extends through the near wall of the sleeve, through the stem, and its reduced end 16 is threaded into the far wall boss 11. A shoulder 17 limits the axial movement of the handle toward the stem, and movement in the opposite direction may be limited by a retaining ring 18 on the extreme end of the threaded portion of the handle. The counterbore 19 is shown closed by a snap-in plug 20.

As will be apparent, a slight twist or rotation of the handle in one direction about its own axis serves to move the sleeve toward the valve stem and so move the friction material into engagement with the housing and lock the valve against movement. Subsequent rotation of the handle in the opposite direction about its own axis relieves the pressure of the friction material against the housing and hence frees the valve. When the valve is free, it is adjustable as usual by swinging the handle about the stem axis and, since the arcuate housing surface 14 is concentric with the stem, it is available to receive the friction material in the different valve setting dispositions of the actuating handle.

In the light of the foregoing exemplification of the invention, the following is claimed:

1. Valve locking mechanism comprising the combination with a housing, a rotary valve therein and a valve stem protruding from the housing, of an actuating handle extending transversely through and rotatably mounted in the protruding valve stem, means for limiting axial movement of the handle, the latter having a threaded end portion projecting beyond the stem and a locking shoe engaged with said threaded end portion for movement toward the valve stem in response to rotation of the handle in one direction about its own axis, the valve housing having an arcuate portion concentric with the stem axis and located for engagement by the locking shoe in different valve setting dispositions of the actuating handle.

2. Valve locking mechanism comprising the combination with a housing, a rotary valve therein and a valve stem protruding from the housing, of an actuating handle extending transversely of and rotatably mounted in the protruding valve stem, means for limiting axial movement of the handle, the latter having a threaded portion adjacent the valve stem and a locking shoe engaged with said threaded portion for movement toward the valve stem in response to rotation of the handle in one direction about its own axis, the valve housing having an arcuate portion concentric with the stem axis and located for engagement by the locking shoe in different valve setting dispositions of the actuating handle.

3. Valve locking mechanism comprising the combination with a housing, a rotary valve therein and a valve stem protruding from the housing, of a sleeve surrounding and laterally movable with respect to the protruding valve stem, and actuating handle extending transversely of and rotatably mounted in the protruding valve stem, means for limiting axial movement of the handle, the latter having threaded engagement with a wall of said sleeve, whereby the sleeve is moved laterally of the valve stem in response to rotation of the handle in one direction about its own axis, the said sleeve having a locking portion overlying a surface of the housing and mounted for movement with said sleeve during the rotation of said handle in said one direction to engage said surface, said surface being arcuate, concentric with the stem axis, and located for engagement by the said locking portion in different valve setting dispositions of the actuating handle.

References Cited in the file of this patent

UNITED STATES PATENTS 2,665,879     Housekeeper     Jan. 12, 1954